(12) United States Patent
Nishiyama et al.

(10) Patent No.: US 11,970,118 B2
(45) Date of Patent: Apr. 30, 2024

(54) OPTICAL UNIT AND VEHICLE INCLUDING OPTICAL UNIT

(71) Applicant: Murata Manufacturing Co., Ltd., Nagaokakyo (JP)

(72) Inventors: Kenji Nishiyama, Nagaokakyo (JP); Yasuhiro Shimizu, Nagaokakyo (JP); Masaki Nagata, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 692 days.

(21) Appl. No.: 17/098,682

(22) Filed: Nov. 16, 2020

(65) Prior Publication Data

US 2021/0061186 A1 Mar. 4, 2021

Related U.S. Application Data

(63) Continuation of application No. PCT/JP2020/009613, filed on Mar. 6, 2020.

(30) Foreign Application Priority Data

Jul. 2, 2019 (JP) .................................. 2019-123486

(51) Int. Cl.
| | |
|---|---|
| *B60R 11/04* | (2006.01) |
| *G02B 1/18* | (2015.01) |
| *H04N 23/55* | (2023.01) |
| *H04N 23/57* | (2023.01) |

(52) U.S. Cl.
CPC ................ *B60R 11/04* (2013.01); *G02B 1/18* (2015.01); *H04N 23/55* (2023.01); *H04N 23/57* (2023.01)

(58) Field of Classification Search
CPC ....... B60R 11/04; G02B 1/18; G02B 27/0006; H04N 23/55; H04N 23/57
USPC ........................................................ 348/148
See application file for complete search history.

(56) References Cited

U.S. PATENT DOCUMENTS

| | | | |
|---|---|---|---|
| 2006/0281889 A1 | 12/2006 | Kobayashi et al. | |
| 2011/0266375 A1* | 11/2011 | Ono ........................... | B60S 1/54 239/589 |
| 2017/0349147 A1* | 12/2017 | Blank ...................... | B60S 1/566 |
| 2018/0335622 A1* | 11/2018 | Trebouet ............... | B60S 1/0848 |

(Continued)

FOREIGN PATENT DOCUMENTS

| | | | | |
|---|---|---|---|---|
| JP | 2000-047081 A | | 2/2000 | |
| JP | 2000047081 A | * | 2/2000 | ............ G03B 17/08 |

(Continued)

OTHER PUBLICATIONS

Official Communication issued in International Patent Application No. PCT/JP2020/009613, mailed on Jun. 2, 2020.

*Primary Examiner* — Mohamed A. Wasel
(74) *Attorney, Agent, or Firm* — Keating & Bennett, LLP (57) ABSTRACT

An optical unit includes an optical sensor, a protective cover disposed in a direction of view from the optical sensor, an actuator to drive the protective cover, and a casing including a space between the casing and the protective cover and to which the optical sensor and the protective cover are attached. A first region on the casing adjacent to an outer edge of the protective cover with the space interposed between the casing and the outer edge of the protective cover is a hydrophobic region where a contact angle of a droplet is equal to or larger than a predetermined angle.

20 Claims, 5 Drawing Sheets

(56) References Cited

U.S. PATENT DOCUMENTS

| | | | |
|---|---|---|---|
| 2019/0031147 A1* | 1/2019 | Cheng | B60R 11/04 |
| 2019/0171004 A1* | 6/2019 | Bretagnol | G02B 27/0006 |
| 2020/0039475 A1* | 2/2020 | Ichiguchi | H04N 23/52 |
| 2020/0192084 A1* | 6/2020 | Bretagnol | B60S 1/0848 |
| 2020/0254979 A1* | 8/2020 | Bretagnol | G03B 29/00 |
| 2023/0280584 A1* | 9/2023 | Gossele | G03B 17/08 |
| | | | 359/507 |

FOREIGN PATENT DOCUMENTS

| | | |
|---|---|---|
| JP | 2002-356651 A | 12/2002 |
| JP | 2005-331410 A | 12/2005 |
| JP | 2009-074480 A | 4/2009 |
| JP | 2019-011043 A | 1/2019 |
| JP | 2019-044010 A | 3/2019 |
| JP | 2019-052195 A | 4/2019 |
| WO | 2018/198464 A1 | 11/2018 |

* cited by examiner

FIG.1

ROTATION

OPTICAL UNIT AND VEHICLE INCLUDING OPTICAL UNIT

CROSS REFERENCE TO RELATED APPLICATIONS

This application claims the benefit of priority to Japanese Patent Application No. 2019-123486 filed on Jul. 2, 2019 and is a Continuation Application of PCT Application No. PCT/JP2020/009613 filed on Mar. 6, 2020. The entire contents of each application are hereby incorporated herein by reference.

BACKGROUND OF THE INVENTION

1. Field of the Invention

The present invention relates to an optical unit and a vehicle including the optical unit.

2. Description of the Related Art

In recent years, safety device control and automatic drive control have been performed by disposing, at the front or the rear of a vehicle, an optical unit including an optical sensor, such as an image pickup device, and by using the images obtained by the optical unit. Such an optical unit is often disposed on the exterior of a vehicle, and thus foreign matter, such as raindrops, mud, or dust, sometimes adheres to a light-transmitting element (a lens or a protective cover) that covers the exterior of the optical unit. When foreign matter adheres to a light-transmitting element, the adhered foreign matter is reflected in the images obtained by the optical unit thereof, and thus clear images cannot be obtained.

In an optical unit described in Japanese Unexamined Patent Application Publication No. 2019-11043, a housing that includes a compartment configured to accommodate an optical sensor and a light-transmitting element (a lens or a protective cover) that is securely fastened to the housing can be driven to rotate around a rotation axis. In the optical unit described in Japanese Unexamined Patent Application Publication No. 2019-11043, the foreign matter (for example, raindrops or water drops) adhering to the light-transmitting element disposed in a direction of view from the optical sensor is removed by driving the housing and the light-transmitting element to rotate.

However, in the optical unit described in Japanese Unexamined Patent Application Publication No. 2019-11043, the light-transmitting element has to be driven to rotate relative to a casing to remove the foreign matter adhering to the light-transmitting element, and thus a space is inevitably formed between the light-transmitting element and the casing. For example, the foreign matter removed by driving the light-transmitting element to rotate may enter the space formed between the light-transmitting element and the casing. For example, foreign matter entering the space may cause failure of an actuator configured to drive the light-transmitting element to rotate.

SUMMARY OF THE INVENTION

Preferred embodiments of the present invention provide optical units and vehicles each including an optical unit. The optical units are each capable of easily preventing failure of an actuator to drive a light transmitter.

An optical unit according to a preferred embodiment of the present invention includes an optical sensor, a light transmitter disposed in a direction of view from the optical sensor, an actuator to drive the light transmitter, and a casing that includes a space between the casing and the light transmitter and to which the optical sensor and the light transmitter are attached. A first region on the casing adjacent to an outer edge of the light transmitter with the space interposed between the casing and the outer edge of the light transmitter is a hydrophobic region where a contact angle of a droplet is equal to or larger than a predetermined angle.

A vehicle according to a preferred embodiment of the present invention includes an optical sensor and an optical unit. The casing is an exterior portion of the vehicle.

According to preferred embodiments of the present invention, the first region on the casing is the hydrophobic region where a contact angle of a droplet is equal to or larger than a predetermined angle. With this configuration, it is possible to prevent, for example, foreign matter from entering the space between the light transmitter and the casing and to thus prevent failure of the actuator.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Optical units according to preferred embodiments of the present invention will be described in detail below with reference to the drawings. In the drawings, portions and elements denoted by the same reference signs are the same or corresponding portions or elements.

Preferred Embodiment 1

Figure 1:
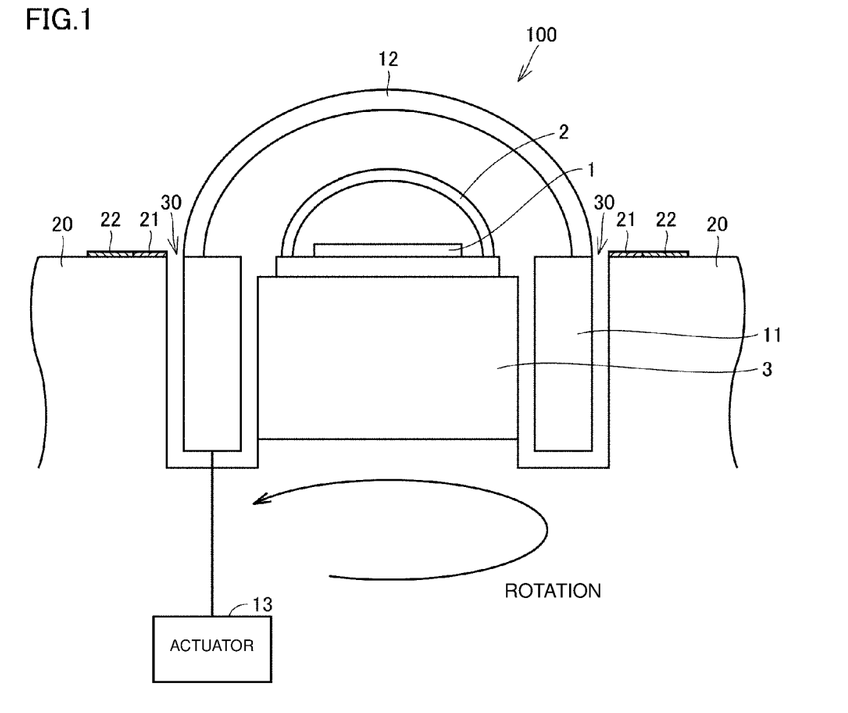
FIG. 1 is a schematic diagram of an optical unit according to Preferred Embodiment 1 of the present invention.

An optical unit according to Preferred Embodiment 1 of the present invention will be described below with reference to the drawings. FIG. 1 is a schematic diagram of an optical unit 100 according to Preferred Embodiment 1. The optical unit 100 is attached to, for example, the front or the rear of a vehicle and is configured to obtain information such as the shape, the color, and the temperature of an object and information such as the distance to an object. In the optical unit 100, an optical sensor 1 to obtain information such as the shape, the color, and the temperature of an object and information such as the distance to an object is attached to a casing 20. The casing 20 is, for example, an exterior portion (the body) of a vehicle and includes an opening on the exterior portion at the position corresponding to the position of the optical sensor 1. The casing 20 may be a dedicated member to which the optical sensor 1 is attached. The location at which the optical unit 100 is attached is not limited to that of a vehicle. The optical unit 100 may be attached to other objects, such as ships and aircraft.

When the optical unit 100 is attached to, for example, a vehicle and is used outdoors, foreign matter, such as raindrops, mud, or dust, for example, sometimes adheres to a light transmitter (a lens or a protective cover) that is disposed in a direction of view from the optical sensor 1 and that covers the exterior of the optical unit 100. For this reason, to remove the foreign matter adhering to the light transmitter, an actuator to drive the light transmitter is disposed in the optical unit 100.

Specifically, the optical unit 100 includes a lens 2, which guides light to a sensor surface of the optical sensor 1, a holder 3, which holds the optical sensor 1 and the lens 2, a movable portion 11, a protective cover (light transmitter) 12, which is transparent and disposed, outside the lens 2, on a surface of the movable portion 11, and an actuator 13, which rotates the movable portion 11 and the protective cover 12. The actuator 13 includes a motor (not illustrated), and the motor drives the movable portion 11 to rotate the protective cover 12 relative to the holder 3. That is, the actuator 13 is a rotating mechanism for the protective cover 12 and is a remover that removes, by a centrifugal force, the foreign matter adhering to a surface of the protective cover 12. The motor may be any type of motor.

The holder 3, which holds the optical sensor 1 and the lens 2, is fixed to the casing 20, such as an exterior portion of a vehicle. A surface of the casing 20 is adjacent to the outer edge of the protective cover 12 with a space 30 interposed therebetween. The space 30 is positioned between the movable portion 11 and the casing 20 and between the protective cover 12 and the casing 20, and thus the movable portion 11 and the protective cover 12 can be driven to rotate relative to the casing 20.

The movable portion 11 has a cylindrical shape and is preferably made of, for example, a metal or a synthetic resin. The movable portion 11 may have a different shape, such as a prism shape. The protective cover 12 is disposed on one end of the movable portion 11, and the actuator 13 is connected to the other end of the movable portion 11.

The protective cover 12 has a dome shape extending from the one end of the movable portion 11. In the present preferred embodiment, the dome shape is preferably a hemispherical shape, for example. The optical sensor 1 preferably has a field of view of, for example, 170°. However, the dome shape is not limited to a hemispherical shape. The protective cover 12 may have, for example, a shape in which a hemispherical shape is joined to a cylindrical shape, or a curved-surface shape smaller than a hemispherical shape. The protective cover 12 may be flat. The entire protective cover 12 has a light transparency sufficient at least to allow light having target wavelengths for the optical sensor 1 to be transmitted. Thus, the light to be transmitted through the protective cover 12 may be visible light or invisible light.

In the present preferred embodiment, the protective cover 12 is preferably made of glass, for example. However, the material for the protective cover 12 is not limited to glass.

The protective cover 12 may be made of a resin such as a transparent plastic, for example. Alternatively, the protective cover 12 may be made of a ceramic having light transparency, for example. However, a tempered glass is preferably used for the protective cover 12 depending on application of the protective cover 12. This enables the strength of the protective cover 12 to be increased. The resin used for the protective cover 12 is preferably, for example, an acrylic resin, a cycloolefin resin, a polycarbonate resin, or a polyester resin. In addition, a coating layer made of, for example, DLC may be provided on the surface of the protective cover 12 to increase the strength of the protective cover 12. In addition, a coating layer such as, for example, a hydrophilic film, a hydrophobic film, a lipophilic film, or a lipophobic film having different hydrophobicity may be provided on the surface of the protective cover 12 according to Preferred Embodiment 1.

The protective cover 12 may be a simple glass cover or may be made of an optical component such as a concave lens, a convex lens, or a flat lens, for example. The optical unit 100 includes the lens 2 inside the protective cover 12. The protective cover 12 and the movable portion 11 may be joined by any method. The protective cover 12 and the movable portion 11 may be joined, for example, with an adhesive or by welding, fitting, or press fitting.

The optical sensor 1 described above is disposed in the protective cover 12. The optical sensor 1 may be, for example, an image sensor such as a complementary MOS (CMOS) or a charge-coupled device (CCD) or may use, for example, light detection and ranging (LiDAR), which uses laser. When an image sensor is used in the optical sensor 1, the optical sensor 1 captures outside imaging targets through the lens 2 and the protective cover 12.

The lens 2 has a dome shape extending from one end of the holder 3. In the present preferred embodiment, the dome shape is preferably a hemispherical shape, for example. The lens 2 may be flat. The entire lens 2 has a light transparency sufficient at least to allow light having target wavelengths for the optical sensor 1 to be transmitted. Thus, the light to be transmitted through the lens 2 may be visible light or invisible light.

Although the lens 2 is made of an optical component such as a concave lens, a convex lens, or a flat lens, the lens 2 may be a simple glass cover. The optical unit 100 may further include an optical component inside the lens 2. The lens 2 and the holder 3 may be joined by any method. The lens 2 and the holder 3 may be joined, for example, with an adhesive or by welding, fitting, or press fitting.

In the present preferred embodiment, the lens 2 is preferably made of glass, for example. However, the material for the lens 2 is not limited to glass. The lens 2 may be made of a resin such as a transparent plastic, for example. Alternatively, the lens 2 may be made of a ceramic having light transparency, for example. In addition, a coating layer made of, for example, DLC may be provided on a surface of the lens 2 to increase the strength of the lens 2. A coating layer such as a hydrophilic film, a hydrophobic film, a lipophilic film, or a lipophobic film may be provided on the surface of the lens 2 such that, for example, the surface has soiling resistance.

The holder 3 has a cylindrical shape and is preferably made of, for example, a metal or a synthetic resin. The holder 3 may have a different shape, such as a prism shape. The one end of the holder 3 holds the optical sensor 1 and the lens 2.

In the optical unit 100, the rotating mechanism that rotates the protective cover 12 is used as a remover to remove the foreign matter adhering to the protective cover 12. When the protective cover 12 is rotated by the rotating mechanism to remove the foreign matter adhering to the protective cover 12, the distance traveled by a portion closer to the circumferential edge of the protective cover 12 is long, and the distance traveled by a portion closer to the center of the protective cover 12 is short. That is, in the protective cover 12, the centrifugal force on the portion closer to the center is smaller than the centrifugal force on the portion closer to the circumferential edge. Thus, the water drops adhering to the protective cover 12 flow toward the portion closer to the circumferential edge of the protective cover from the portion closer to the center.

The water drops that have flowed toward the portion closer to the circumferential edge reach the space 30. However, in the optical unit 100 according to Preferred Embodiment 1, a hydrophobic region 21 (first region) is disposed on the surface of the casing 20, which is adjacent to the outer edge of the protective cover 12 with the space 30 interposed therebetween. The hydrophobic region 21 disposed close to the space 30 repels the water drops that flow toward the portion closer to the circumferential edge and causes the water drops to flow further outward without entering the space 30. In the optical unit 100, a hydrophilic region 22 (second region) is disposed outside the hydrophobic region 21 to make it easier for the water drops repelled by the hydrophobic region 21 to flow further outward.

Figure 2:
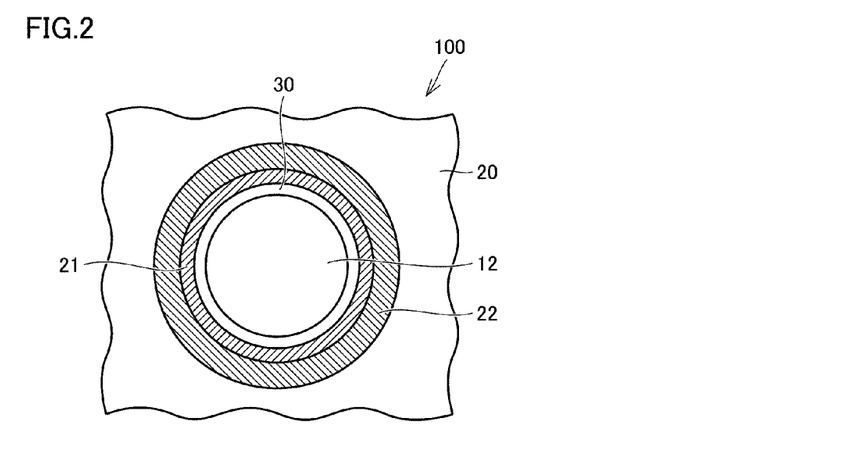
FIG. 2 is a plan view illustrating a hydrophobic region and a hydrophilic region disposed on a casing according to Preferred Embodiment 1 of the present invention.

FIG. 2 is a plan view illustrating the hydrophobic region and the hydrophilic region 22 disposed on the casing 20 according to Preferred Embodiment 1. FIG. 2 is a plan view of the protective cover 12 illustrated in FIG. 1 when viewed from above. The hydrophobic region 21 is disposed on the casing 20 all along the outer edge of the protective cover 12. The hydrophobic region 21 does not have to be disposed on the casing 20 all along the outer edge of the protective cover 12 as long as the hydrophobic region 21 enables water drops to be repelled without entering the space 30. For example, the hydrophobic region 21 may be disposed discontinuously such that hydrophobic portions are arranged with spaces smaller than a water drop therebetween.

The hydrophobic region 21 can be formed by applying a coating material having a high hydrophobicity to the surface of the casing 20. Examples of such a coating material having a high hydrophobicity are broadly divided into fluorine-based coating materials and silicone-based coating materials. Examples of fluorine-based coating materials include coating materials that include, as a main component, a compound including a perfluoroalkyl group (a group in which hydrogen atoms in an alkyl group are substituted with fluorine atoms), and coating materials that include, as a main component, a compound containing a perfluoroalkyl group. Specific examples of fluorine-based coating materials include fluorine-based polymers and polytetrafluoroethylene (PTFE) and are described in detail in, for example, Japanese Unexamined Patent Application Publication No. 2019-52195. Examples of silicone-based coating materials include materials having a main chain in which silicon (Si) and oxygen (O) are directly bonded to each other. Specific examples of silicone-based coating materials include silicone oils and are described in detail in, for example, Japanese Unexamined Patent Application Publication No. 2002-356651.

The hydrophilic region 22 does not have to be disposed on the casing 20. When the hydrophilic region 22 is disposed on the casing 20, a coating material having a hydrophobicity lower than the hydrophobic region 21 may be applied to the casing 20. Examples of such a coating material having a low hydrophobicity, that is, a coating material having a high hydrophilicity, include monomers or polymers including a hydrophilic group typified by a hydroxyl group (—OH), a carboxyl group (—COOH), or an amino group (—NH). Specific examples of an organic coating material having a high hydrophilicity include hydrophilic acrylic resins and colloidal silica-containing resins and are described in detail in, for example, Japanese Unexamined Patent Application Publication No. 2019-44010. Such a coating material having a high hydrophilicity is not limited to an organic substance and may be an inorganic substance. Examples of an inorganic coating material having a high hydrophilicity include porous silica, calcium phosphate, and inorganic materials including a silicon compound as a main component. A region having a high hydrophilicity may be formed on the surface of the casing 20 by coating the surface of the casing 20 with an inorganic coating material through, for example, etching or plasma treatment. In addition, a region having a high hydrophilicity may be formed by applying ozone treatment to the surface of the casing 20 or by coating the surface of the casing 20 with a photocatalyst such as titanium oxide, for example.

Figure 3:
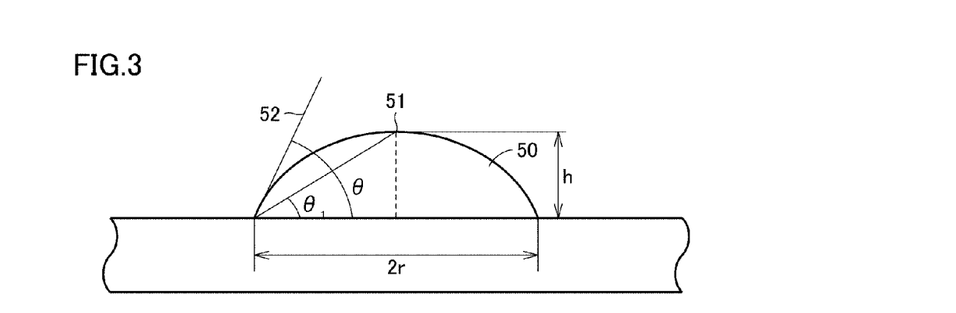
FIG. 3 is a conceptual diagram for describing hydrophobicity and hydrophilicity.

Hereinafter, hydrophobicity and hydrophilicity will be described. FIG. 3 is a conceptual diagram for describing hydrophobicity and hydrophilicity. Hydrophobicity and hydrophilicity can be evaluated with the angle formed by a droplet and the surface of the casing 20 (hereinafter also simply referred to as the contact angle of a droplet). As illustrated in FIG. 3, the contact angle of a droplet is represented by the angle θ between a tangent to a droplet 50 and the surface of the casing 20 and is a numerical form into which the amount of swelling of a droplet (height h of a liquid) formed by dripping the liquid onto the surface of the casing 20 is converted. It can be assumed that a microdroplet shape is a portion of a circle, and thus, in accordance with a geometric theorem, the angle θ that is the contact angle of a droplet is twice the angle $θ_i$ ($θ=2θ_i$) formed by a straight line from an outer edge point of the droplet 50 to a vertex of the droplet 50 and the surface of the casing 20.

The hydrophobic region 21 is, when expressed as a contact angle, a region where the contact angle of a droplet is equal to or larger than a predetermined angle. The hydrophilic region 22 is, when expressed as a contact angle, a region where the contact angle of a droplet is smaller than a predetermined angle.

Figure 4A:
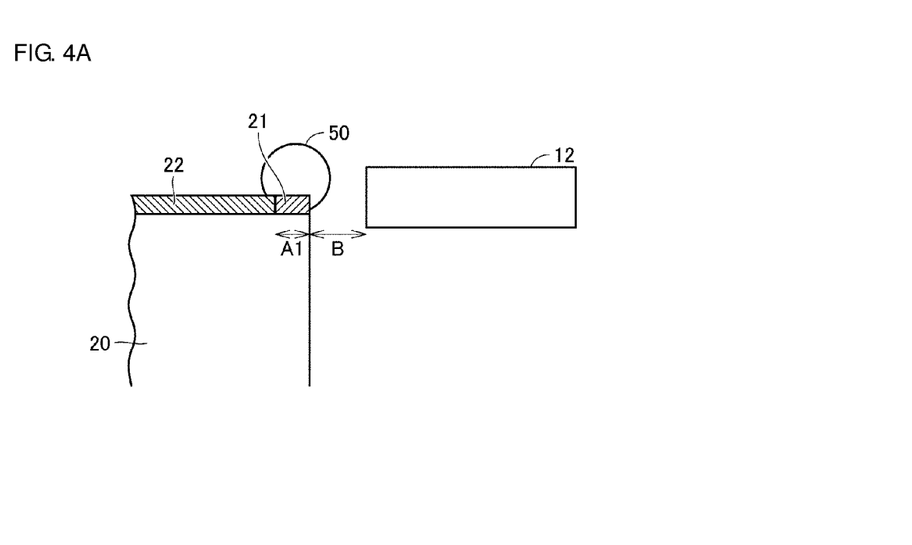
FIGS. 4A and 4B include diagrams for describing the relationship between the width of the hydrophobic region and the width of a space.
Figure 4B:
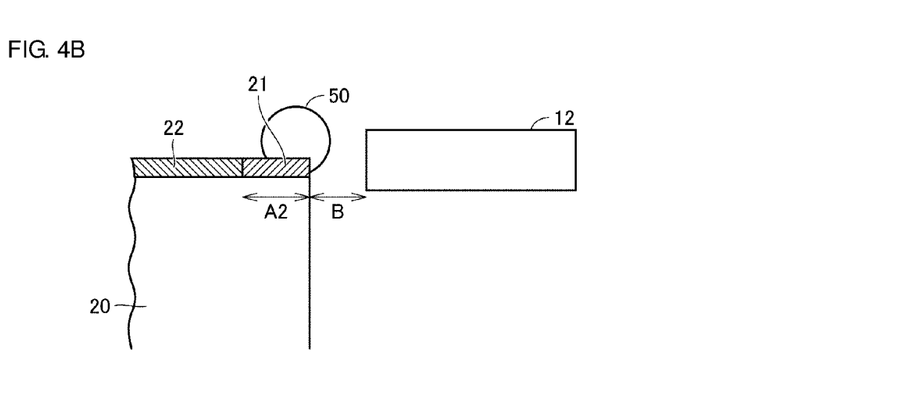

As described above, the hydrophobic region 21 disposed on the surface of the casing 20 causes water drops to flow outward without entering the space 30. In addition, the hydrophobic region 21 having a width smaller than the width of the space 30 enables water drops to easily flow further outward. FIGS. 4A and 4B include diagrams for describing the relationship between the width of the hydrophobic region 21 and the width of the space 30. In FIG. 4A, a width A1 of the hydrophobic region 21 is smaller than a width B of the space 30 (A1<B). For this reason, although a droplet on the protective cover 12 passes over the space 30 and reaches the hydrophobic region 21, the droplet does not remain on the hydrophobic region 21 smaller than the width B of the space 30. A force to move the droplet 50 toward the hydrophilic region 22 outside the hydrophobic region 21 is then exerted on the droplet 50. To simplify FIGS. 4A and 4B, FIGS. 4A and 4B do not illustrate the protective cover 12 having a dome shape but illustrates the protective cover 12 having a plate shape.

On the other hand, in FIG. 4B, a width A2 of the hydrophobic region 21 is larger than the width B of the space 30 (A2>B). For this reason, after a droplet on the protective cover 12 passes over the space 30 and reaches the hydrophobic region 21, the droplet is likely to remain on the hydrophobic region 21 larger than the width B of the space 30. That is, even when the droplet 50 moves to the hydrophobic region 21, the droplet 50 is unlikely to come into contact with the hydrophilic region 22 outside the hydrophobic region 21. Thus, a force to move the droplet 50 toward the hydrophilic region 22 has little effect on the droplet 50.

Figure 5A:
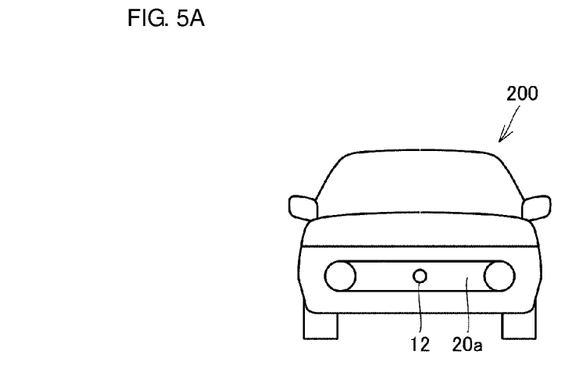
FIGS. 5A and 5B include schematic diagrams of an example in which an optical unit is disposed in a vehicle.
Figure 5B:
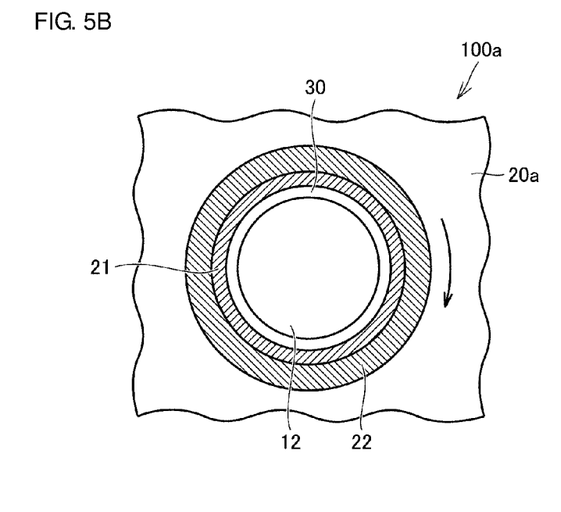

Next, an example in which an optical unit is disposed in a vehicle is specifically described. FIGS. 5A and 5B include schematic diagrams of an example in which an optical unit 100a is disposed in a vehicle. As illustrated in FIG. 5A, in a vehicle 200, an exterior portion (a casing) 20a of a front grille includes an opening. The protective cover 12 of the optical unit 100a is attached so as to be visible through the opening.

As a result, as illustrated in FIG. 5B, in the optical unit 100a, the space 30 is provided between the protective cover and the exterior portion 20a. For example, water or dirt entering the space may cause failure of an actuator. Thus, the hydrophobic region 21 disposed on the exterior portion 20a, which is adjacent to the outer edge of the protective cover 12 with the space 30 interposed therebetween, prevents, for example, water or dirt from entering the space 30. In addition, in the optical unit 100a, the hydrophilic region 22 is disposed outside the hydrophobic region 21 to avoid obstructing the view from the optical sensor 1 due to, for example, water or dirt remaining on the hydrophobic region 21.

Also in the optical unit 100a, preferably, the width of the hydrophobic region 21 is smaller than the width of the space 30. An arrow in FIG. 5B indicates a direction in which the protective cover 12 rotates when the actuator 13 drives the protective cover 12 to rotate.

As described above, the optical unit 100 according to Preferred Embodiment 1 includes the optical sensor 1, the protective cover 12, which is disposed in the direction of view from the optical sensor 1, the actuator 13, which drives the protective cover 12, and the casing 20, which includes the space 30 between the casing 20 and the protective cover 12 and to which the optical sensor 1 and the protective cover 12 are attached. The first region on the casing 20 adjacent to the outer edge of the protective cover 12 with the space 30 interposed therebetween is the hydrophobic region 21 where the contact angle of a droplet is equal to or larger than a predetermined angle.

Accordingly, in the optical unit 100 according to Preferred Embodiment 1, the first region on the casing 20 is the hydrophobic region 21 where the contact angle of a droplet is equal to or larger than a predetermined angle. With this configuration, it is possible to prevent, for example, foreign matter from entering the space 30 between the protective cover 12 and the casing 20 and to thus prevent failure of the actuator 13.

Preferably, the hydrophobic region 21 is disposed on the casing 20 all along the outer edge of the protective cover 12. With this configuration, it is possible to prevent, for example, foreign matter from entering anywhere in the outer edge of the protective cover 12. In addition, preferably, the width of the hydrophobic region 21 is smaller than the space 30 between the outer edge of the protective cover 12 and the casing 20. This configuration enables, for example, foreign matter to more easily move outside the hydrophobic region 21. In addition, preferably, a region on the casing 20 outside the hydrophobic region 21 is the hydrophilic region 22 where the contact angle of a droplet is smaller than a predetermined angle. This configuration enables, for example, foreign matter to more easily move to the hydrophilic region 22 outside the hydrophobic region 21. In addition, the actuator 13 may drive the protective cover 12 to rotate around an axis disposed within the field of view of the optical sensor 1. This configuration of the optical unit 100 enables the protective cover 12 to rotate and the foreign matter adhering to the surface of the protective cover 12 to be removed by a centrifugal force.

The vehicle 200 includes the optical unit 100a. The casing may be the exterior portion 20a of the vehicle 200. With this configuration of the optical unit 100a, it is possible to prevent, for example, foreign matter from entering the space 30 between the protective cover 12 and the exterior portion 20a of the vehicle 200 and to thus prevent failure of the actuator 13.

Preferred Embodiment 2

Figure 6:
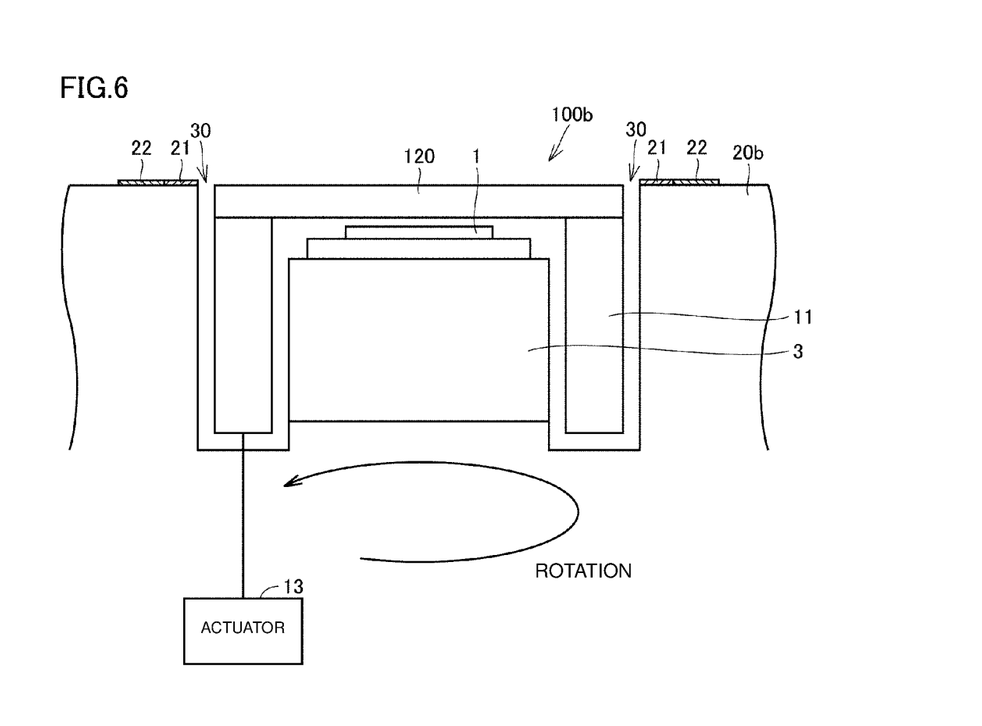
FIG. 6 is a schematic diagram of an optical unit according to Preferred Embodiment 2 of the present invention.

In the description of the optical unit 100 according to Preferred Embodiment 1, the protective cover 12 has a dome shape. However, the shape of the protective cover 12 may be a shape other than a dome shape. A protective cover in an optical unit according to Preferred Embodiment 2 of the present invention has a plate shape. FIG. 6 is a schematic diagram of an optical unit 100b according to Preferred Embodiment 2. In the optical unit 100b, the optical sensor 1 for obtaining information such as the shape, the color, and the temperature of an object and information such as the distance to an object is attached to a casing 20b. The casing 20b is, for example, an exterior portion (the body) of a vehicle and includes an opening on the exterior portion at the position corresponding to the position of the optical sensor 1. The casing 20b may be a dedicated member to which the optical sensor 1 is attached.

The optical unit 100b includes the lens 2, which guides light to the sensor surface of the optical sensor 1, the holder 3, which holds the optical sensor 1 and the lens 2, the movable portion 11, a protective cover (light transmitter) 120, which has a plate shape and is transparent and disposed on the surface of the movable portion 11, and the actuator 13, which rotates the movable portion 11 and the protective cover 120. The configuration of the optical unit 100b is the same or substantially the same as that of the optical unit 100 except that the shape of the protective cover 120 differs from that in the optical unit 100 illustrated in FIG. 1. The same or similar components have the same reference signs, and the detailed descriptions are not repeated.

The holder 3, which holds the optical sensor 1 and the lens 2, is fixed to the casing 20b, such as an exterior portion of a vehicle, for example. A surface of the casing 20b is adjacent to the outer edge of the protective cover 120 with the space 30 interposed therebetween. The space 30 is positioned between the movable portion 11 and the casing 20b and between the protective cover 120 and the casing 20b, and thus the movable portion 11 and the protective cover 120 can be driven to rotate relative to the casing 20b. Similarly to the optical unit 100, the hydrophobic region 21 and the hydrophilic region 22 are disposed on the surface of the casing 20b.

Figure 7:
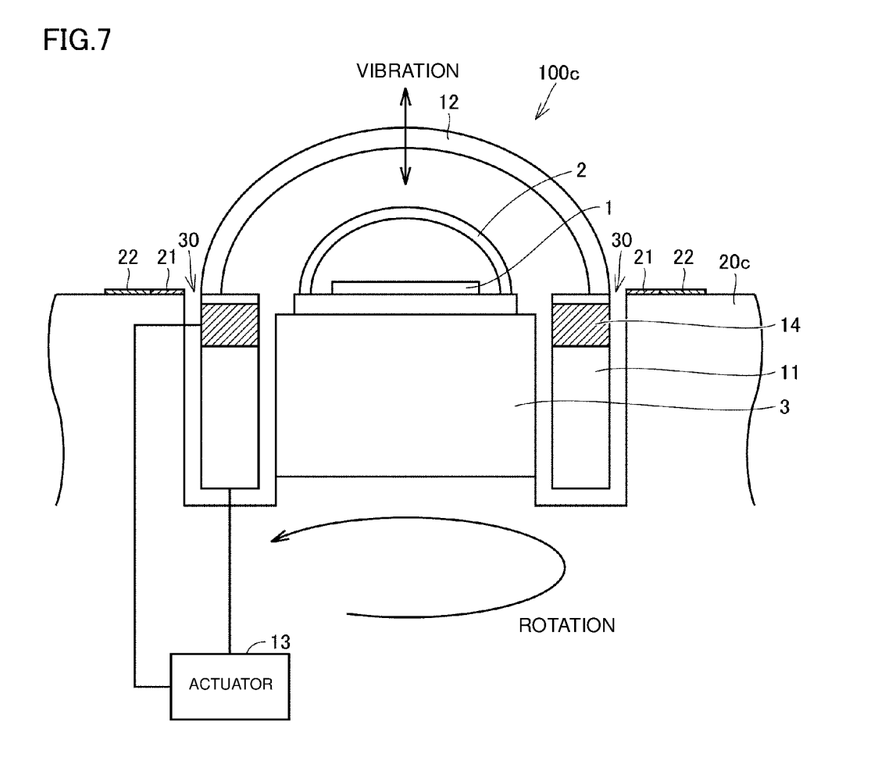
FIG. 7 is a schematic diagram of an optical unit according to a modification of Preferred Embodiment 2 of the present invention.

In the descriptions of the optical units 100, 100a, and 100b, the rotating mechanism that rotates the protective cover defines and functions as a remover to remove the foreign matter adhering to the protective cover. However, the remover is not limited thereto. For example, a vibrator that vibrates a light transmitter may be disposed as a remover. FIG. 7 is a schematic diagram of an optical unit 100c according to a modification of Preferred Embodiment 2. In FIG. 7, the rotating mechanism that rotates the protective cover 12 (light transmitter) is combined with a vibrator 14, which vibrates the protective cover 12. The configuration of the optical unit 100c illustrated in FIG. 7 is the same or substantially the same as that of the optical unit 100 illustrated in FIG. 1, except that the configuration to drive the protective cover 12 differs from that of the optical unit 100. The same or similar components have the same reference signs, and the detailed descriptions are not repeated.

The optical unit 100c includes the optical sensor 1, the lens 2, which guides light to the sensor surface of the optical sensor 1, the holder 3, which holds the optical sensor 1 and the lens 2, the movable portion 11, the protective cover (light transmitter) 12, which is transparent and disposed outside the lens 2, on the surface of the movable portion 11, the actuator 13, which rotates the protective cover 12, and the vibrator 14, which vibrates the movable portion 11. The actuator 13 includes a motor (not illustrated), and the motor drives the movable portion 11 to rotate the protective cover 12 relative to the holder 3. The actuator 13 supplies a driving signal to the vibrator 14 to vibrate the protective cover 12.

The vibrator 14 preferably has, for example, a cylindrical shape and is a piezoelectric vibrator. The piezoelectric vibrator vibrates by, for example, being polarized in the thickness direction. The piezoelectric vibrator is preferably made of, for example, PZT-based piezoelectric ceramics. However, other piezoelectric ceramics made of, for example, $(K,Na)NbO_3$ may be used in the piezoelectric vibrator. In addition, piezoelectric single crystals made of, for example, $LiTaO_3$ may be used in the piezoelectric vibrator.

In the optical unit 100c illustrated in FIG. 7, the rotating mechanism that rotates the protective cover 12 is combined with the vibrator 14, which vibrates the protective cover 12. However, the optical unit may have a configuration in which the vibrator 14, which vibrates the protective cover 12, is disposed by itself.

As described above, in the optical unit 100c according to the modification of Preferred Embodiment 2, the actuator 13 drives the protective cover 12 to vibrate. This configuration of the optical unit 100c enables the protective cover 12 to vibrate and the foreign matter adhering to the surface of the protective cover 12 to be removed by the vibration.

The optical units according to the above preferred embodiments may include a camera, LiDAR, or Rader, for example.

The optical units according to the above preferred embodiments are not limited to optical units disposed in vehicles and can be applied similarly to optical units whose uses require that the protective cover 12 disposed within the field of view of an optical sensor to be cleaned.

In the descriptions of the configurations of the optical units according to the above preferred embodiments, the hydrophilic region 22 is disposed in a region on the casing 20 outside the hydrophobic region 21. However, the hydrophilic region 22 does not have to be provided. It is simply required that a region where the contact angle of a droplet is smaller than that on the hydrophobic region 21 is positioned outside the hydrophobic region 21, and thus the hydrophilic region 22 does not have to be provided.

Figure 8:
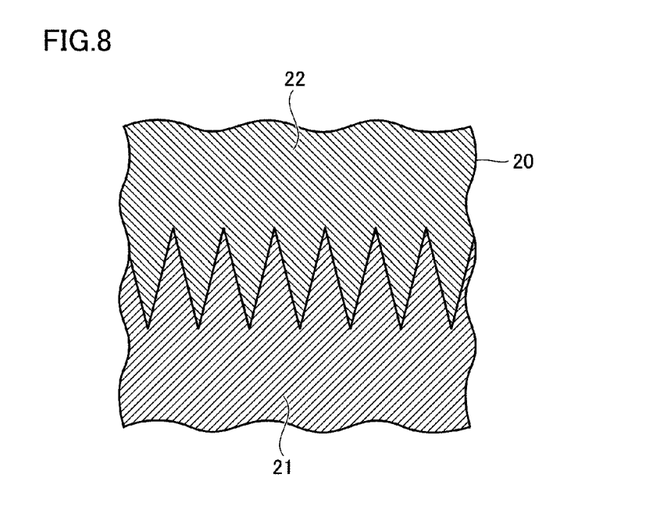
FIG. 8 is a diagram for describing a boundary line between a hydrophobic region (first region) and a hydrophilic region (second region).

A boundary line between the hydrophobic region (first region) 21 and the hydrophilic region (second region) 22 is not limited to a straight line and may have a comb shape, for example. FIG. 8 is a diagram for describing the boundary line between the hydrophobic region (first region) 21 and the hydrophilic region (second region) 22. As illustrated in FIG. 8, the boundary line between the hydrophobic region 21 and the hydrophilic region 22 having a comb shape enables a droplet that has reached the hydrophobic region 21 to more easily come into contact with the hydrophilic region 22. Thus, a force to move the droplet 50 toward the hydrophilic region 22 outside the hydrophobic region 21 has larger effect on the droplet 50.

As a remover, the rotating mechanism that rotates the protective cover 12 may be combined with a mechanism in which an ejector ejects a cleaner (for example, a cleaning fluid or air) to remove foreign matter.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical unit comprising:
   an optical sensor;
   a light transmitter disposed in a direction of view from the optical sensor;
   an actuator to drive the light transmitter; and
   a casing including a space between the casing and the light transmitter and to which the optical sensor and the light transmitter are attached; wherein
   a first region on the casing adjacent to an outer edge of the light transmitter with the space interposed between the casing and the outer edge of the light transmitter is a hydrophobic region in which a contact angle of a droplet is equal to or larger than a predetermined angle.

2. The optical unit according to claim 1, wherein the first region is disposed on the casing along an entirety or substantially an entirety of the outer edge of the light transmitter.

3. The optical unit according to claim 1, wherein a width of the first region is smaller than the space between the outer edge of the light transmitter and the casing.

4. The optical unit according to claim 1, wherein a second region on the casing outside the first region is a hydrophilic region where a contact angle of a droplet is smaller than the predetermined angle.

5. The optical unit according to claim 4, wherein a boundary line between the first region and the second region has a comb shape.

6. The optical unit according to claim 1, wherein the actuator drives the light transmitter to rotate around an axis set within a field of view of the optical sensor.

7. The optical unit according to claim 1, wherein the actuator drives the light transmitter to vibrate.

8. A vehicle comprising:
   the optical unit according to claim 1; wherein
   the casing includes an exterior portion of the vehicle.

9. The optical unit according to claim 4, wherein a boundary line between the first region and the second region is a straight line.

10. The optical unit according to claim 1, further comprising:
    a lens to guide light to a sensor surface of the optical sensor;
    a holder to hold the optical sensor and the lens; and
    a movable portion; wherein
    the light transmitter is disposed outside the lens on a surface of the movable portion.

11. The optical unit according to claim 1, wherein the light transmitter is transparent.

12. The vehicle according to claim 8, wherein the first region is disposed on the casing along an entirety or substantially an entirety of the outer edge of the light transmitter.

13. The vehicle according to claim 8, wherein a width of the first region is smaller than the space between the outer edge of the light transmitter and the casing.

14. The vehicle according to claim 8, wherein a second region on the casing outside the first region is a hydrophilic region where a contact angle of a droplet is smaller than the predetermined angle.

15. The vehicle according to claim 14, wherein a boundary line between the first region and the second region has a comb shape.

16. The vehicle according to claim 8, wherein the actuator drives the light transmitter to rotate around an axis set within a field of view of the optical sensor.

17. The vehicle according to claim 8, wherein the actuator drives the light transmitter to vibrate.

18. The vehicle according to claim 14, wherein a boundary line between the first region and the second region is a straight line.

19. The vehicle according to claim 8, further comprising:
 a lens to guide light to a sensor surface of the optical sensor;
 a holder to hold the optical sensor and the lens; and
 a movable portion; wherein
 the light transmitter is disposed outside the lens on a surface of the movable portion.

20. The vehicle according to claim 8, wherein the light transmitter is transparent.

\* \* \* \* \*